US012632603B2

(12) United States Patent
Kwak et al.

(10) Patent No.: US 12,632,603 B2
(45) Date of Patent: May 19, 2026

(54) METHOD AND SYSTEM FOR DETECTING FORGERY OF MOBILE APPLICATION BY USING USER IDENTIFIER AND SIGNATURE COLLECTION

(71) Applicant: NAVER Cloud Corp., Seongnam-si (KR)

(72) Inventors: MunSoo Kwak, Seongnam-si (KR); Byeong Jae Lee, Seongnam-si (KR); Ae Ji Kim, Seongnam-si (KR); Won Bin Choi, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 362 days.

(21) Appl. No.: 17/977,659

(22) Filed: Oct. 31, 2022

(65) Prior Publication Data

US 2023/0074627 A1 Mar. 9, 2023

Related U.S. Application Data

(63) Continuation of application No. PCT/KR2021/005455, filed on Apr. 29, 2021.

(30) Foreign Application Priority Data

May 6, 2020 (KR) ........................ 10-2020-0054042
Jun. 2, 2020 (KR) ........................ 10-2020-0066346

(51) Int. Cl.
*G06F 21/64* (2013.01)
*G06F 21/55* (2013.01)

(52) U.S. Cl.
CPC ............ *G06F 21/64* (2013.01); *G06F 21/552* (2013.01); *G06F 21/554* (2013.01)

(58) Field of Classification Search
CPC ...... G06F 21/64; G06F 21/552; G06F 21/554; G06F 21/44; G06F 21/57; G06F 21/51; G06F 8/61; H04L 63/08; H04L 9/32
See application file for complete search history.

(56) References Cited

U.S. PATENT DOCUMENTS

2011/0047594 A1* 2/2011 Mahaffey ................ G06F 21/50
726/1
2014/0090077 A1* 3/2014 Jeong ...................... G06F 21/51
726/26
(Continued)

FOREIGN PATENT DOCUMENTS

JP 2014106652 A 6/2014
KR 10-2013-0097444 9/2013
(Continued)

OTHER PUBLICATIONS

Office Action issued in corresponding Japanese patent application No. 2022-562801, dated Oct. 14, 2022.

*Primary Examiner* — Wasika Nipa
*Assistant Examiner* — Edgar W Xie
(74) *Attorney, Agent, or Firm* — GREER BURNS & CRAIN, LTD.

(57) ABSTRACT

A client transmits signature information for an application and a user's identifier (for example, user ID) to a server, and the server allows an application operator to decide whether to allow or block application authentication according to the business circumstances, and thus, forgery of a mobile application can be flexibly detected without registering all signatures in advance.

12 Claims, 11 Drawing Sheets

Start

Receive app signature authentication information on application from mobile terminal in response to execution of application being attempted in mobile terminal — 910

Receive selection to allow or block authentication for app signature authentication information through operator terminal of application — 920

Store app signature authentication information for allowing or blocking authentication for app signature authentication information according to selection — 930

Allow execution of application in mobile terminal in response to authentication being allowed — 940

Block execution of application in mobile terminal in response to authentication being blocked — 950

Receive app signature authentication information on application from mobile terminal in response to re-execution of application being attempted in mobile terminal — 960

Allow re-execution of application in response to app signature authentication information being stored for allowing authentication for app signature authentication information — 970

Block re-execution of application in response to app signature authentication information being stored for blocking authentication for app signature authentication information — 980

End

(56)                    References Cited

U.S. PATENT DOCUMENTS

| | | | | |
|---|---|---|---|---|
| 2016/0127367 A1* | 5/2016 | Jevans | .................... | G06F 21/64 |
| | | | | 713/152 |
| 2018/0018458 A1* | 1/2018 | Schmugar | ............. | G06F 21/554 |
| 2018/0189478 A1* | 7/2018 | Richardson | ............. | G06F 21/50 |

FOREIGN PATENT DOCUMENTS

| | | |
|---|---|---|
| KR | 10-2015-0022429 | 3/2015 |
| KR | 10-2015-0030047 | 3/2015 |
| KR | 10-1566141 | 10/2015 |
| KR | 10-2015-0124076 | 11/2015 |
| KR | 10-2017-0140630 | 12/2017 |

* cited by examiner

FIG. 7

Allow        710        711

| User identifier | App name | Package name | Allowed time | Signature | Status | |
|---|---|---|---|---|---|---|
| AAA | A | c.b.a | 2020-01-22 11:02:33 | AFAEAGRADSF | Allowed | Block |
| BBB | A | c.b.a | 2020-01-22 11:02:32 | SADFAWDFAE | Allowed | Block |
| CCC | B | d.c.b | 2020-01-22 11:02:31 | BASDFASDFFD | Allowed | Block |
| DDD | A | c.b.a | 2020-01-22 11:02:31 | ASDFAADFFAS | Allowed | Block |
| ... | ... | ... | ... | ... | ... | ... |

Block        720        721

| User identifier | App name | Package name | Blocked time | Block count | Signature | |
|---|---|---|---|---|---|---|
| EEE | A | c.b.a | 2020-01-22 11:02:33 | 2 | PDMCLWD | Allow |
| FFF | A | c.b.a | 2020-01-22 11:02:32 | 3 | NOWDKCK | Allow |
| GGG | B | d.c.b | 2020-01-22 11:02:31 | 1 | OGNKWCK | Allow |
| HHH | A | c.b.a | 2020-01-22 11:02:31 | 3 | QPTHOLFQ | Allow |
| ... | ... | ... | ... | ... | ... | ... |

FIG. 9

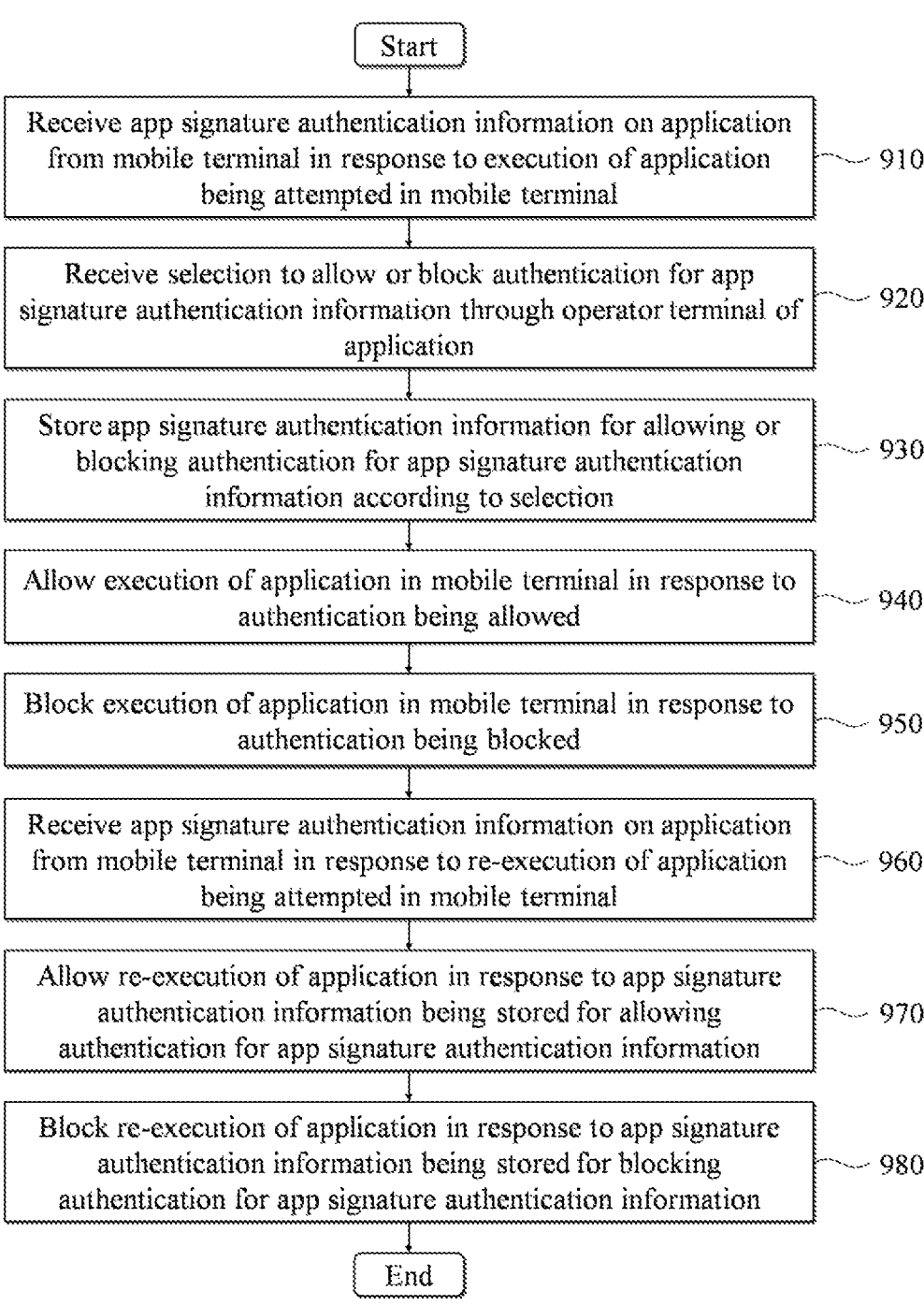

Start

Receive app signature authentication information on application from mobile terminal in response to execution of application being attempted in mobile terminal ~ 910

Receive selection to allow or block authentication for app signature authentication information through operator terminal of application ~ 920

Store app signature authentication information for allowing or blocking authentication for app signature authentication information according to selection ~ 930

Allow execution of application in mobile terminal in response to authentication being allowed ~ 940

Block execution of application in mobile terminal in response to authentication being blocked ~ 950

Receive app signature authentication information on application from mobile terminal in response to re-execution of application being attempted in mobile terminal ~ 960

Allow re-execution of application in response to app signature authentication information being stored for allowing authentication for app signature authentication information ~ 970

Block re-execution of application in response to app signature authentication information being stored for blocking authentication for app signature authentication information ~ 980

End

METHOD AND SYSTEM FOR DETECTING FORGERY OF MOBILE APPLICATION BY USING USER IDENTIFIER AND SIGNATURE COLLECTION

This is a continuation application of International Application No. PCT/KR2021/005455, filed Apr. 29, 2021, which claims the benefit of Korean Patent Application Nos. 10-2020-0066346 and 10-2020-0054042, filed Jun. 2, 2020 and May 6, 2020, respectively.

TECHNICAL FIELD

One or more example embodiments of the following description relate to a mobile application forgery detection method and system using a user identifier and signature collection.

RELATED ART

As the related art for detecting forgery of a mobile application, there is technology that generates a whitelist by registering in advance signature information used for development and distribution of the mobile application to an authentication server, compares "signature information of a currently running and/or installed mobile application" and "signature information registered to a server (signature information registered to the whitelist)" at a time of executing the mobile application, and, when "signature information of the currently running and/or installed mobile information" is not registered to the whitelist, allows a client side or a server side to determine that the currently running mobile application is forged and blocks execution of the corresponding application or suspends installation.

However, when more diverse signature information, such as a signature for development, a signature for distribution, and a signature for quality assurance (QA), is generated, all of the signatures need to be registered in advance to use the existing forgery detection technology. That is, the whitelist needs to be maintained for forgery detection before providing a service. Therefore, unless normal signature information is registered in advance, even a normal application may be determined as a forged application and may not be used accordingly.

PRIOR ART DOCUMENT NO

Korean Patent Registration No. 10-1566141

DETAILED DESCRIPTION

Subject

One or more example embodiments provide a method and system that may flexibly detect forgery of a mobile application without registering in advance all of the signatures in such a manner that a client side delivers signature information on an application and an identifier of a user (e.g., a user ID) to a server side, and the server side allows an application operator side to determine whether to allow or block an application authentication according to a business situation.

Solution

According to an aspect of at least one example embodiment, there is provided a forgery detection method performed by a computer apparatus including at least one processor, the forgery detection method including, in response to execution of an application being attempted in a mobile terminal, receiving, by the at least one processor, app signature authentication information on the application from the mobile terminal; receiving, by the at least one processor, a selection to allow or block authentication for the app signature authentication information through an operator terminal of the application; storing, by the at least one processor, the app signature authentication information for allowing or blocking the authentication for the app signature authentication information according to the selection; in response to the authentication being allowed, allowing, by the at least one processor, the execution of the application in the mobile terminal; and in response to the authentication being blocked, blocking, by the at least one processor, the execution of the application in the mobile terminal.

According to an aspect, the receiving of the selection may include providing a page that includes a first function for displaying the app signature authentication information and a second function for receiving the selection to allow or block the authentication for the app signature authentication information; and verifying that the authentication is selected to be allowed or blocked through the second function in the provided page.

According to another aspect, the page may further include a third function for displaying a list of authentication-allowed app signature authentication information and a list of authentication-blocked app signature authentication information, a fourth function for changing authentication-allowed app signature authentication information with authentication-blocked app signature authentication information, and a fifth function for changing authentication-blocked app signature authentication information with authentication-allowed app signature authentication information.

According to still another aspect, the storing information for allowing or blocking the authentication may include in response to the selection to allow the authentication for the app signature authentication information, adding the app signature authentication information to a whitelist; and in response to the selection to block the authentication for the app signature authentication information, adding the app signature authentication information to a blacklist.

According to still another aspect, the forgery detection method may further include in response to re-execution of the application being attempted in the mobile terminal, receiving, by the at least one processor, app signature authentication information on the application from the mobile terminal; in response to the app signature authentication information being stored for allowing the authentication for the app signature authentication information, allowing, by the at least one processor, the re-execution of the application; and in response to the app signature authentication information being stored as blocking the authentication for the app signature authentication information, blocking, by the at least one processor, the re-execution of the application.

According to still another aspect, the app signature authentication information may include user information on a user of the mobile terminal and signature information of the application. The app signature authentication information may further include a package name of the application and a version of the application as basic information of the application.

According to still another aspect, the app signature authentication information may further include terminal information on the mobile terminal, and the terminal information may include at least one of an embedded multimedia card (EMMC) ID, an international mobile station equipment identity (IMEI), and a media access control (MAC) address.

According to an aspect of at least one example embodiment, there is provided a forgery detection method performed by a computer apparatus including at least one processor, the forgery detection method including in response to execution of an application installed on the computer apparatus being attempted, extracting, by the at least one processor, app signature authentication information on the application; and transmitting, by the at least one processor, the extracted app signature authentication information to an authentication server. The app signature authentication information includes user information on a user of the computer apparatus and signature information of the application.

According to an aspect of at least one example embodiment, there is provided a computer-program stored in a computer-readable recording medium to perform the method in a computer apparatus in conjunction with the computer apparatus.

According to an aspect of at least one example embodiment, there is provided a computer-readable recording medium storing a computer program to perform the method in a computer apparatus.

According to an aspect of at least one example embodiment, there is provided a computer apparatus including at least one processor configured to execute computer-readable instructions. The at least one processor is configured to, in response to execution of an application being attempted in a mobile terminal, receive app signature authentication information on the application from the mobile terminal, receive a selection to allow or block authentication for the app signature authentication information through an operator terminal of the application, store the app signature authentication information for allowing or blocking the authentication for the app signature authentication information according to the selection, in response to the authentication being allowed, allow the execution of the application in the mobile terminal, and in response to the authentication being blocked, block the execution of the application in the mobile terminal.

According to an aspect of at least one example embodiment, there is provided a computer apparatus including at least one processor configured to execute computer-readable instructions. The at least one processor is configured to, in response to execution of an application installed on the computer apparatus being attempted, extract app signature authentication information on the application, and transmit the extracted app signature authentication information to an authentication server. The app signature authentication information includes user information on a user of the computer apparatus and signature information of the application.

Effect

According to some example embodiments, it is possible to flexibly detect forgery of a mobile application without registering in advance all of the signatures in such a manner that a client side delivers signature information on an application and an identifier of a user (e.g., a user ID) to a server side and the server side allows an application operator side to determine whether to allow or block an application authentication according to a business situation.

BRIEF DESCRIPTION OF DRAWINGS

FIG. 7 illustrates an example of a user interface included in a page for authentication control of an app operator according to an example embodiment.

FIG. 9 is a flowchart illustrating an example of a forgery detection method of an authentication server according to an example embodiment.

Hereinafter, some example embodiments will be described with reference to the accompanying drawings.

A forgery detection system according to the example embodiments may be implemented by at least one computer apparatus. Here, a computer program according to an example embodiment may be installed and executed on the computer apparatus, and the computer apparatus may perform a forgery detection method according to the example embodiments under control of the executed computer program. The aforementioned computer program may be stored in a computer-readable storage medium to computer-implement the forgery detection method in conjunction with the computer apparatus.

Figure 1:
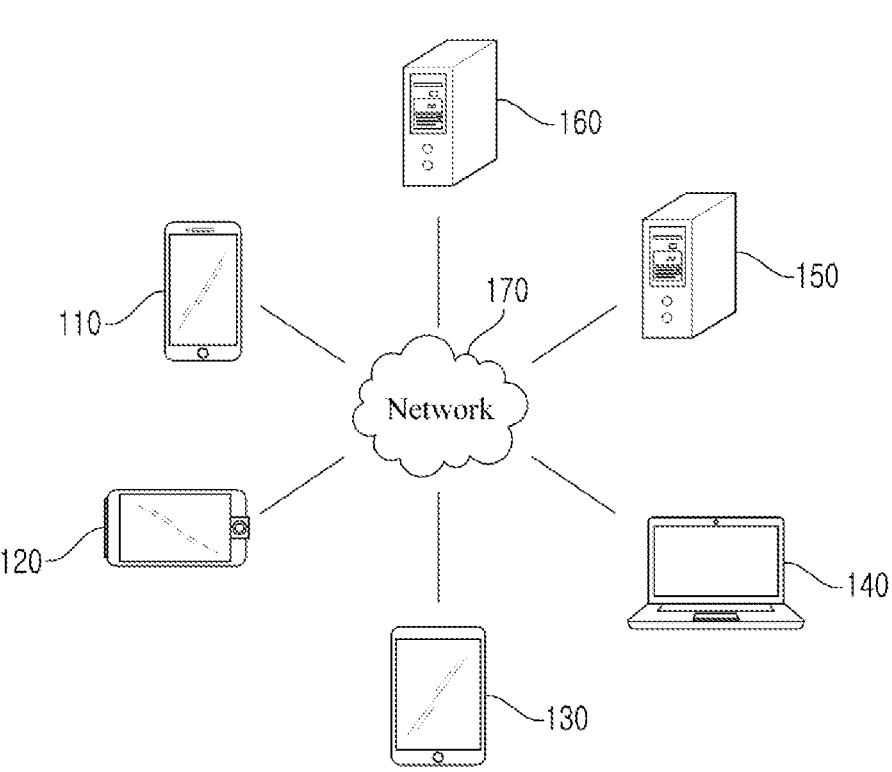
FIG. 1 is a diagram illustrating an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. The number of electronic devices and/or the number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may each be embodied as a smartphone, a mobile phone, a navigation device, a computer, a laptop computer, a digital broadcasting terminal, a personal digital assistant (PDA), a portable multimedia player (PMP), a tablet personal computer (PC), or the like. For example, although FIG. 1 illustrates the shape of a smartphone as an example of the electronic device 110, the electronic device 110 used herein may consist of any one of various types of physical computer apparatuses capable of communicating with other electronic devices 120, 130, and 140, and/or the servers 150 and 160 over the network 170 in a wireless or wired communication manner.

The communication scheme is not limited, and may include a near field wireless communication scheme between devices as well as a communication scheme using a communication network (e.g., a mobile communication network, wired Internet, wireless Internet, and a broadcasting network) includable in the network 170. For example, the network 170 may include at least one of a variety of network topologies, including a personal area network (PAN), a local area network (LAN), a campus area network (CAN), a metropolitan area network (MAN), a wide area network (WAN), a broadband network (BBN), and the Internet. Also, the network 170 may include at least one of a variety of network topologies, including a bus network, a star network, a ring network, a mesh network, a star-bus network, a tree or hierarchical network, and the like. However, these network topologies are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., an instant messaging service, a game service, a group call service (or an audio conference service), a messaging service, a mail service, a social network service, a map service, a translation service, a financial service, a payment service, a search service, a content providing service, etc.) to the plurality of electronic devices 110, 120, 130, and 140 connected over the network 170.

Figure 2:
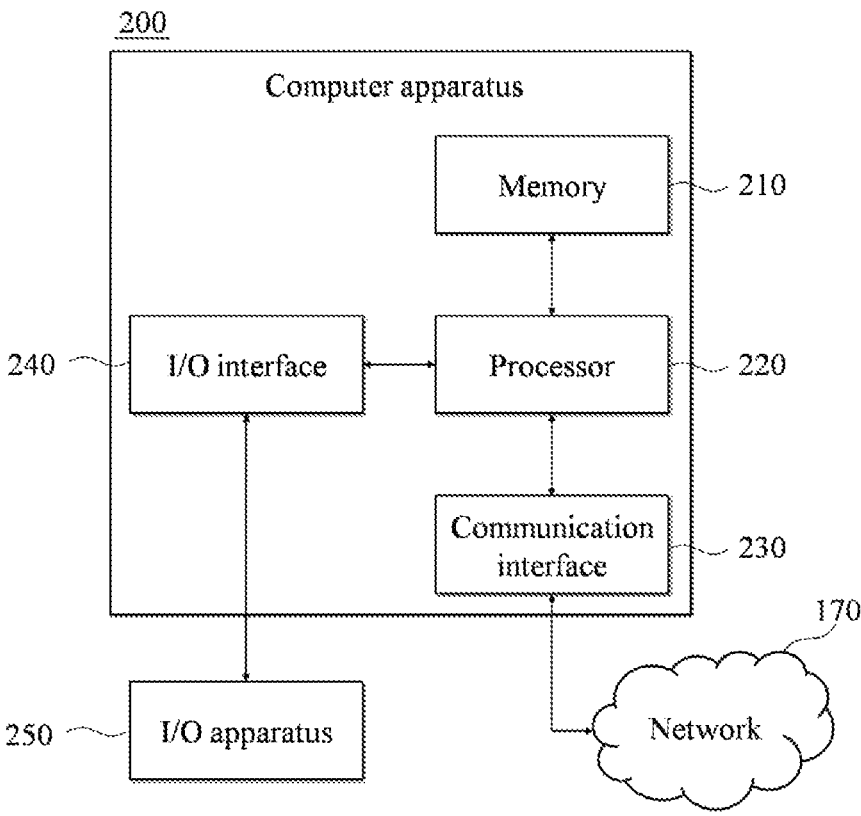
FIG. 2 is a diagram illustrating an example of a computer apparatus according to an example embodiment.

FIG. 2 is a block diagram illustrating an example of a computer apparatus according to an example embodiment. Each of the plurality of electronic devices 110, 120, 130, and 140, or each of the servers 150 and 160, may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable record medium. The permanent mass storage device, such as a ROM and/or a disk drive, may be included in the computer apparatus 200 as a permanent storage device separate from the memory 210. Also, an OS (operating system) and at least one program code may be stored in the memory 210. Such software components may be loaded to the memory 210 from another computer-readable record medium separate from the memory 210. The other computer-readable record medium may include a computer-readable record medium, for example, a floppy drive, a disk, a tape, a DVD/CD-ROM drive, a memory card, etc. According to other example embodiments, software components may be loaded to the memory 210 through the communication interface 230, instead of through the computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The instructions may be provided from the memory 210 or from the communication interface 230 to the processor 220. For example, the processor 220 may be configured to execute received instructions in response to program code stored in the storage device, such as the memory 210.

The communication interface 230 may provide a function for communication between the communication apparatus

200 and another apparatus (e.g., the aforementioned storage devices) over the network 170. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal or an instruction, data, a file, etc., from another apparatus may be received at the computer apparatus 200 through the communication interface 230 of the computer apparatus 200. A signal or an instruction, data, etc., received through the communication interface 230 may be forwarded to the processor 220 or the memory 210, and a file, etc., may be stored in a storage medium (e.g., the permanent storage device) further includable in the computer apparatus 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. At least one of the I/O apparatus 250 may be configured as a single apparatus with the computer apparatus 200. For example, the I/O apparatus 250 may be implemented in a form in which a touchscreen, a microphone, a speaker, etc., are included in the computer apparatus 200, such as a smartphone.

Also, according to other example embodiments, the computer apparatus 200 may include a number of components that is greater than or less than the number of components shown in FIG. 2. However, there is no need to clearly illustrate many components according to the related art. For example, the computer apparatus 200 may include at least a portion of the I/O apparatus 250, or may further include other components, for example, a transceiver, a database, etc.

The following "app" disclosed herein may represent an application.

Figure 3:
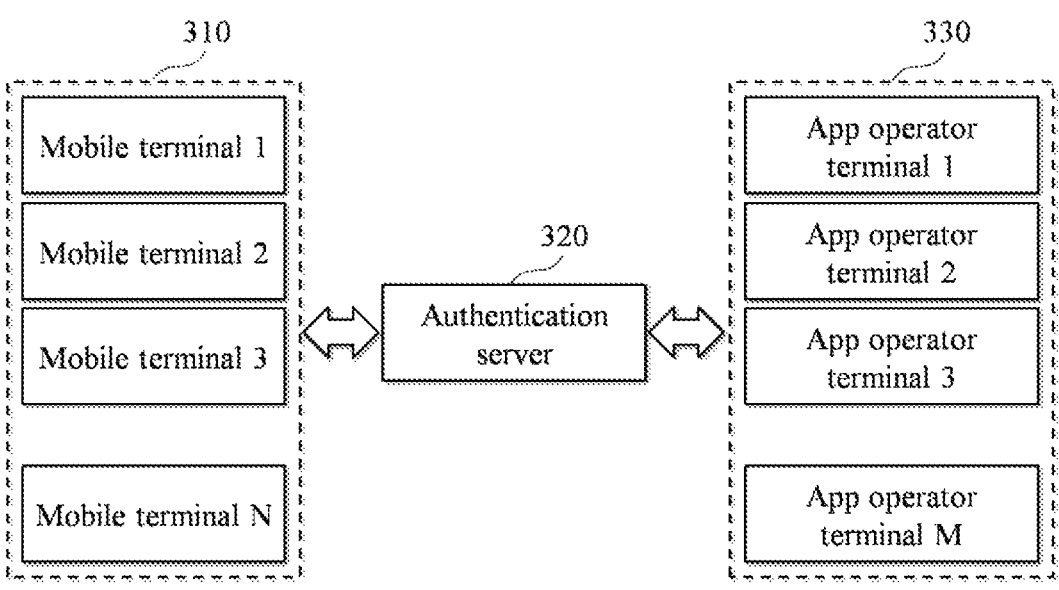
FIG. 3 is a diagram illustrating an example of an overall forgery detection system according to an example embodiment.

FIG. 3 is a diagram illustrating an example of an overall forgery detection system according to an example embodiment. The forgery detection system according to an example embodiment may include a plurality of mobile terminals 310, an authentication server 320, and a plurality of app operator terminals 330.

Each of the plurality of mobile terminal 310 may be an entity that uses services provided from app operators by installing and running its desired app among various apps provided from the plurality of app operators. Each of the plurality of mobile terminals 310 may be implemented by a physical device, such as the computer apparatus 200 of FIG. 2. After an installed app is executed, each of the plurality of mobile terminals 310 may use a service of an app operator using a function provided by the corresponding app itself or a function provided through a server provided by app operators. Meanwhile, each of the plurality of mobile terminals 310 may authenticate an app through communication with the authentication server 320 in an app execution process. Here, when the app is authenticated, execution of the app may be completed in a corresponding mobile terminal. However, when the app is blocked, execution of the app in the corresponding mobile terminal may be blocked. Meanwhile, in response to an app authentication request, each of the plurality of mobile terminals 310 may match signature information of a corresponding app and user information (e.g., a user identifier, such as an ID of the user) and may transmit the same to the authentication server 320.

The authentication server 320 may be an entity that authenticates a corresponding app in response to an app authentication request from each of the plurality of mobile terminals 310. This authentication server 320 may be implemented by a physical device, such as the computer apparatus 200. The authentication server 320 may be implemented by at least two physical devices. The authentication server 320 may receive a result for allowing or blocking authentication for the corresponding app through an app operator of the app for which authentication is requested, and may allow or block execution of the app according to the received result. For example, the authentication server 320 may provide signature information of an app and user information delivered from a mobile terminal that requests authentication of the app to an app operator through a user interface (e.g., a user interface of a page that is provided to the app operator through a web) provided for the app operator of the corresponding app.

The plurality of app operator terminals 330 may be physical devices operated by the app operators. Each of such physical devices may correspond to the computer apparatus 200 of FIG. 2 or may be implemented as the computer apparatus 200. The app operator may access a user interface provided from the authentication server 320 through an app operator terminal of the app operator and may select to allow or block authentication for execution of the app through the user interface based on signature information and user information of the app.

Also, the authentication server 320 may store information regarding whether to allow or block authentication of an app for a signature of the corresponding app. In this case, the authentication server 320 may allow or block the authentication without going through an app operator with respect to the signature of the app of which authentication is allowed or blocked once.

As described above, although a whitelist for authentication of an app is not provided in advance, the authentication server 320 may generate a whitelist and a blacklist for each user and for each signature of the app through an app operator. Such whitelist and blacklist may be shared with the corresponding app operator and the app operator may identify a user that attempts forgery of the app.

Figure 4:
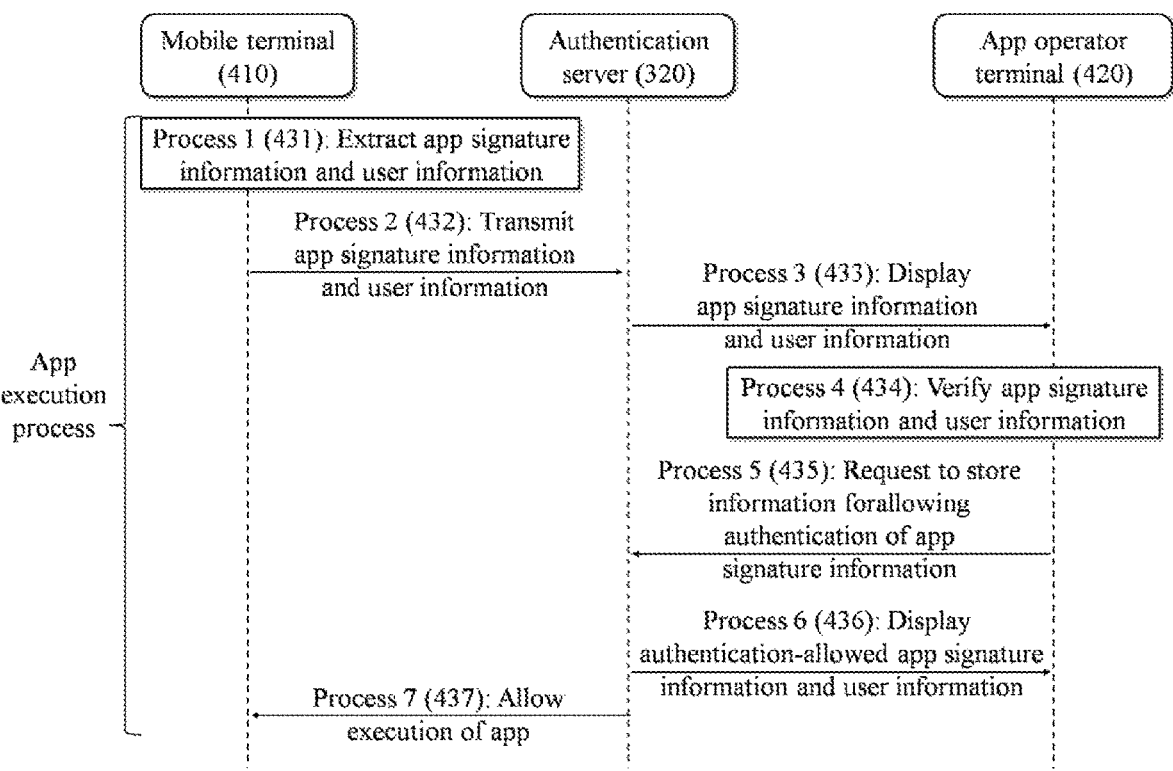
FIG. 4 illustrates an example of an app authentication allow scenario according to an example embodiment.

FIG. 4 illustrates an example of an app authentication allow scenario according to an example embodiment. FIG. 4 illustrates a mobile terminal 410, the authentication server 320, and an app operator terminal 420. Here, the mobile terminal 410 may be one of the plurality of mobile terminals 310 of FIG. 3 and the app operator terminal 430 may be one of the plurality of app operator terminals 330 of FIG. 3. The following process 1 (431) to process 7 (437) may be performed in association with a process in which the mobile terminal 410 attempts to execute an app installed in the mobile terminal 410.

In process 1 (431), the mobile terminal 410 may extract app signature information and user information. The app signature information may be signature information that is generated for the app installed in the mobile terminal 410. If the app is forged, app signature information of the forged app may differ from app signature information of an original app. Also, the user information may include a user identifier of a corresponding user in a service that is provided through the app. Depending on example embodiments, the user information may further include information (at least one of a package name of an application, a version of the application, an embedded multimedia card (EMMC) ID, an international mobile station equipment identity (IMEI), and a media access control (MAC) address) of the mobile terminal 310 in addition to the user identifier.

In process 2 (432), the mobile terminal 410 may transmit the extracted app signature information and user information to the authentication server 320. For example, the mobile terminal 410 may transmit the app signature information and the user information to the authentication server 320 through the network 170 under control of the app.

In process 3 (433), the authentication server 320 may display the app signature information and the user information for an app provider. For example, the authentication server 320 may display the app signature information and the user information through a user interface of a page accessible by the app provider and the app operator may receive the app signature information and the user information by accessing the corresponding page using the app operator terminal 420 of the app operator.

In process 4 (434), the app operator terminal 420 may verify the user information and the app signature information. Here, the user information and the app signature information may be manually verified by the app operator or may be automatically verified through a process of comparing, by the app operator terminal 420, the user information and the app signature information according to a preset logic. For example, the app operator terminal 420 may compare app signature information registered for a corresponding app to app signature information of the app for which authentication is requested and may allow or block authentication of the corresponding app signature information. Also, the app operator terminal 420 may allow or block authentication of app signature information separate from the authentication-requested app signature information with respect to preset users. Here, the example embodiment describes a scenario in a case in which authentication of app signature information is allowed.

In process 5 (435), the app operator terminal 420 may request the authentication server 320 to store information for allowing authentication of the corresponding app signature information. In this case, the authentication server 320 may store app signature authentication information such that authentication for the corresponding user information and the corresponding app signature information may be allowed. Such app signature authentication information may include the corresponding user information and the corresponding app signature information. That is, the corresponding user information and the corresponding app signature information may be added to a whitelist of the authentication server 320.

In process 6 (436), the authentication server 320 may display the app signature information and the user information for which authentication is allowed. For example, the authentication server 320 may display the app signature information, the user information, and information indicating that authentication for the corresponding app signature information and user information is allowed through the user interface of the page. The app operator may receive corresponding information by accessing the page through the app operator terminal 420. This may represent that the app operator may share the whitelist of the authentication server 320 through the page.

In process 7 (437), the authentication server 320 may allow execution of the app. For example, the authentication server 320 may allow execution of the app by allowing the authentication for the app signature information and the user information transmitted from the mobile terminal 410 in operation process 1 431.

In response to a request from the mobile terminal 410 for authentication of the app using the same user information and app signature information, the authentication server 320 may allow authentication for the requested app signature information by referring to the previously stored app signature authentication information and may continuously allow execution of the corresponding app without going through the app operator.

Figure 5:
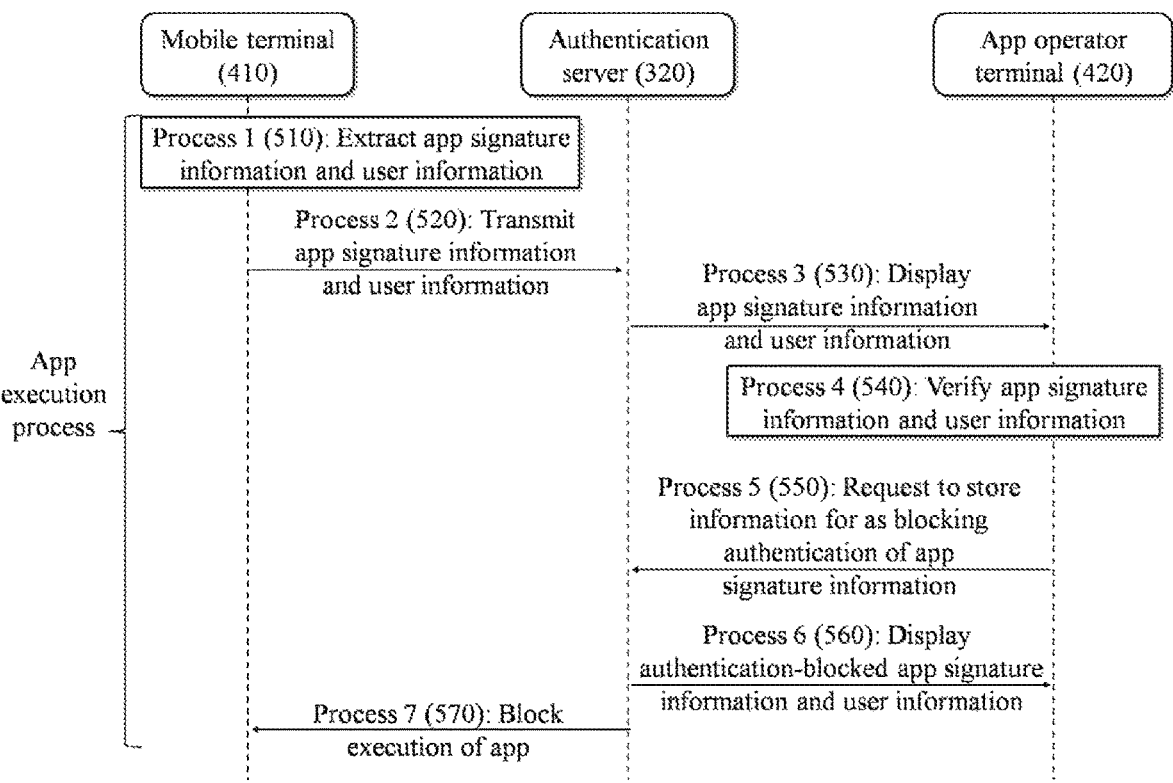
FIG. 5 illustrates an example of an app authentication block scenario according to an example embodiment.

FIG. 5 illustrates an example of an app authentication block scenario according to an example embodiment. FIG. 5 illustrates the mobile terminal 410, the authentication server 320, and the app operator terminal 420. The following process 1 (510) to process 7 (570) may be performed in association with a process in which the mobile terminal 410 attempts to execute an app installed in the mobile terminal 410.

In process 1 (510), the mobile terminal 410 may extract app signature information and user information. The app signature information may be signature information that is generated for the app installed in the mobile terminal 410. If the app is forged, app signature information of the forged app may differ from app signature information of an original app. Also, the user information may include a user identifier of a corresponding user in a service that is provided through the app. As described above, depending on example embodiments, the user information may further include information (at least one of an EMMC ID, an IMEI, and a MAC address) of the mobile terminal 410 in addition to the aforementioned user identifier.

In process 2 (520), the mobile terminal 410 may transmit the extracted app signature information and user information to the authentication server 320. For example, the mobile terminal 410 may transmit the app signature information and the user information to the authentication server 320 through the network 170 under control of the app.

In process 3 (530), the authentication server 320 may display the app signature information and the user information for an app provider. For example, the authentication server 320 may display the app signature information and the user information through a user interface of a page accessible by the app provider, and the app operator may receive the app signature information and the user information by accessing the corresponding page using the app operator terminal 420 of the app operator.

In process 4 (540), the app operator terminal 420 may verify the user information and the app signature information. Here, the user information and the app signature information may be manually verified by the app operator or may be automatically verified through a process of comparing, by the app operator terminal 420, the user information and the app signature information according to a preset logic. For example, the app operator terminal 420 may compare app signature information registered for a corresponding app to app signature information of the app for which authentication is requested and may allow or block authentication of the corresponding app signature information. Also, the app operator terminal 420 may allow or block authentication of app signature information separate from the authentication-requested app signature information with respect to preset users. Herein, the example embodiment describes a scenario in a case in which authentication of app signature information is blocked.

In process 5 (550), the app operator terminal 420 may request the authentication server 320 to store information for blocking authentication of the corresponding app signature information. In this case, the authentication server 320 may store app signature authentication information such that authentication for the corresponding user information and the corresponding app signature information may be blocked. Such app signature authentication information may include the corresponding user information and the corresponding app signature information. That is, the corresponding user information and the corresponding app signature information may be added to a blacklist of the authentication server 320.

In process 6 (560), the authentication server 320 may display the app signature information and the user information for which authentication is blocked. For example, the authentication server 320 may display the app signature information, the user information, and information indicating that authentication for the corresponding app signature information and user information is blocked through the user interface of the page. The app operator may receive corresponding information by accessing the page through the app operator terminal 420. This may represent that the app operator may share the blacklist of the authentication server 320 through the page.

In process 7 (570), the authentication server 320 may block execution of the app. For example, the server 320 may block execution of the app by blocking the authentication for the app signature information and the user information transmitted from the mobile terminal 410 in the first process 510.

In response to a request from the mobile terminal 410 for authentication of the app using the same user information and app signature information, the authentication server 320 may block authentication for the requested app signature information by referring to the previously stored app signature authentication information and may continuously block execution of the corresponding app without the need to go through the app operator.

In this manner, the authentication server 320 may allow or block execution of the app without constructing in advance a whitelist for app signature information on an app and while constructing a whitelist and a blacklist for each user and for each app signature information through the app operator. In addition, once app signature information and user information of a specific user is stored once in the whitelist and the blacklist, execution of the corresponding app of the corresponding user may be continuously allowed or blocked using the constructed whitelist and blacklist.

Figure 6:
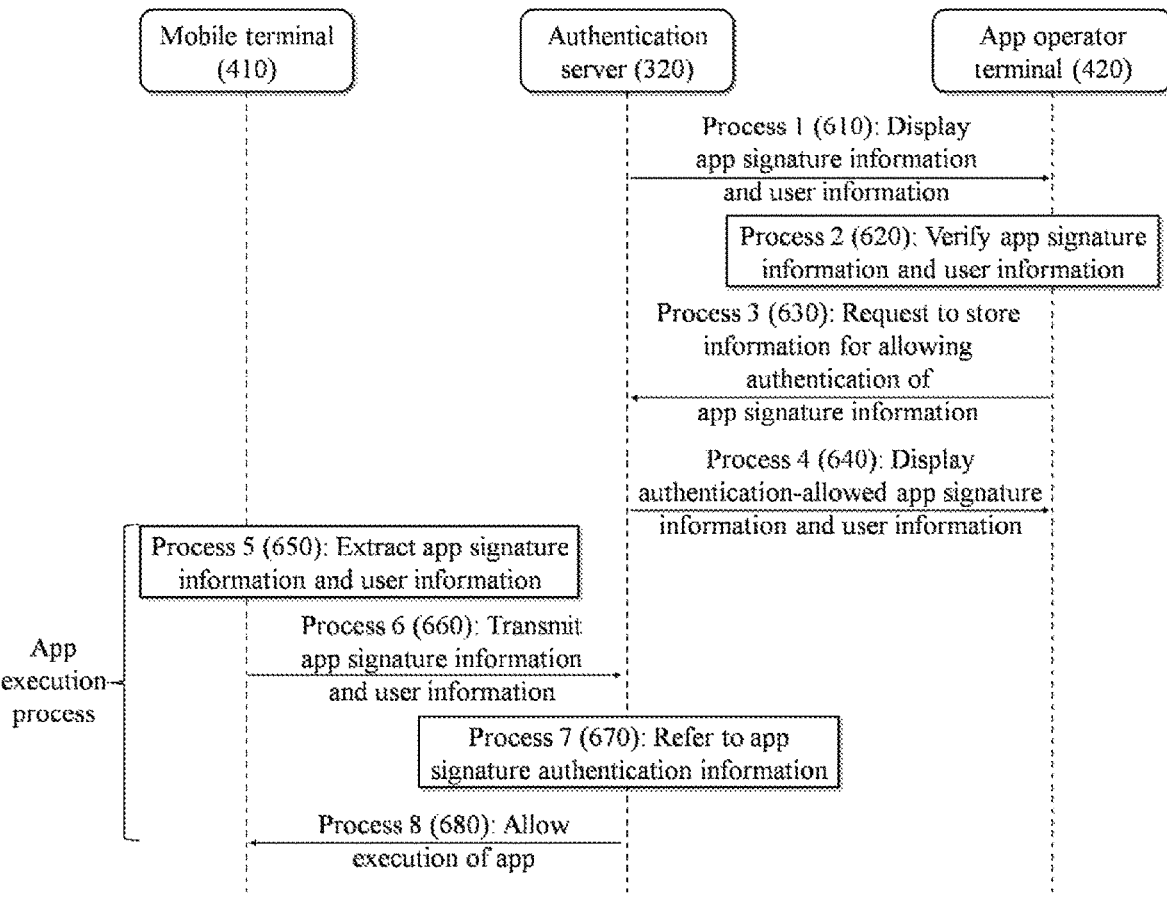
FIG. 6 illustrates an example of a scenario for re-allowing an authentication-blocked app according to an example embodiment.

FIG. 6 illustrates an example of a scenario for re-allowing an authentication-blocked app according to an example embodiment. FIG. 6 illustrates the mobile terminal 410, the authentication server 320, and the app operator terminal 420 described with reference to FIGS. 4 and 5. The following process 1 (610) to process 4 (640) may be performed in association with a process of a previous app execution and the following process 5 (650) to process 8 (680) may be performed in association with a process in which the mobile terminal 410 attempts to currently execute an app installed in the mobile terminal 410.

In process 1 (610), the authentication server 320 may display app signature information and user information for an app provider. For example, the authentication server 320 may display the app signature information and the user information through a user interface of a page accessible by the app provider, and the app operator may receive the app signature information and the user information by accessing the corresponding page using the app operator terminal 420 of the app operator. That is, the app provider may access the page at any time and may verify user information and app signature information related to the app of the app provider. Also, as described above, the app operator may verify whether authentication for the app signature information and the user information is allowed or blocked through the corresponding page, and if necessary, may change allowing the authentication to blocking the same or may change blocking the authentication to allowing the same.

In process 2 (620), the app operator terminal 420 may verify the user information and the app signature information. Here, the user information and the app signature information may be manually verified by the app operator or may be automatically verified through a work of comparing, by the app operator terminal 420, the user information and the app signature information according to a preset logic. For example, the app operator terminal 420 may compare app signature information registered for a corresponding app to app signature information of the app for which authentication is requested, and may allow or block authentication of the corresponding app signature information. Also, the app operator terminal 420 may allow or block authentication of app signature information separate from the authentication-requested app signature information with respect to preset users. Here, the example embodiment describes a scenario in a case in which the app operator changes blocked authentication for app signature information to be allowed through the app operator terminal 420. To this end, the aforementioned page may include a user interface for selecting to either allow or block authentication for specific app signature information and user information.

In process 3 (630), the app operator terminal 420 may request the authentication server 320 to store information for allowing authentication of the corresponding app signature information. For example, when the app operator changes blocked authentication for app signature information to be allowed through the user interface of the page, the above request may be delivered to the authentication server 320. The authentication server 320 may store the app signature authentication information such that authentication for the corresponding user information and the corresponding app signature information may be allowed. That is, user information and app signature information added to the blacklist of the authentication server 320 may be moved to the whitelist.

In process 4 (640), the authentication server 320 may display the authentication-allowed app signature information and user information. For example, the authentication server 320 may display the app signature information, the user information, and information indicating that authentication for the corresponding app signature information and user information is allowed through the user interface of the page. The app operator may receive the corresponding information by accessing the page through the app operator terminal 420.

In the case of executing the corresponding app in the mobile terminal 410, the mobile terminal 410 may extract the app signature information and the user information in process 5 (650) under control of the app, and may transmit the extracted app signature information and user information to the authentication server 320 in process 6 (660). In this case, in process 7 (670), the authentication server 320 may refer to the app signature authentication information for the transmitted app signature information and user information. Since authentication for the corresponding user information and app signature information is stored to be allowed, execution of the app in the mobile terminal 410 may be allowed in process 8 680.

Conversely, it will be easily understood from the aforementioned description that blocked authentication of the app signature information may be changed to be allowed again.

FIG. 7 illustrates an example of a user interface included in a page for authentication control of an app operator according to an example embodiment. FIG. 7 illustrates an allow table 710 including authentication-allowed app signature authentication information as a whitelist and a block table 720 including authentication-blocked app signature authentication information as a blacklist. For example, a first row of the allow table 710 represents information, such as user identifier "AAA", app name "A", package name "c.b.a", allowed time "2020 Jan. 22 11:02:33", signature "AFAEAGRADSF", status "allowed," and the like. In detail, a user corresponding to the user identifier "AAA" may deliver the user identifier "AAA" as user information and the signature "AFAEAGRADSF" as app signature information to the authentication server 320, while requesting authentication at a time of executing an app corresponding to the app name "A" and the package name "c.b.a". In this case, the authentication server 320 may display the user information and the app signature information for the app operator and the app operator may verify the corresponding user information and app signature information and may request the authentication server 320 to store as "allowing" the authentication for the corresponding user information and app signature information. In this case, the corresponding app signature authentication information may be stored as in the first row of the allow table 710 that is the whitelist.

Here, user interfaces 711 for changing allowing authentication for the respective app signature authentication information to blocking the same may be provided to the allow table 710. Likewise, user interfaces 721 for changing blocking authentication for the respective app signature authentication information to allowing the same may be provided to the block table 720. When authentication for app signature authentication information corresponding to the user identifier "AAA" is changed from being allowed to being blocked, the app signature authentication information corresponding to the user identifier "AAA" may be deleted from the allow table 710 and may be added to the block table 720.

Figure 8:
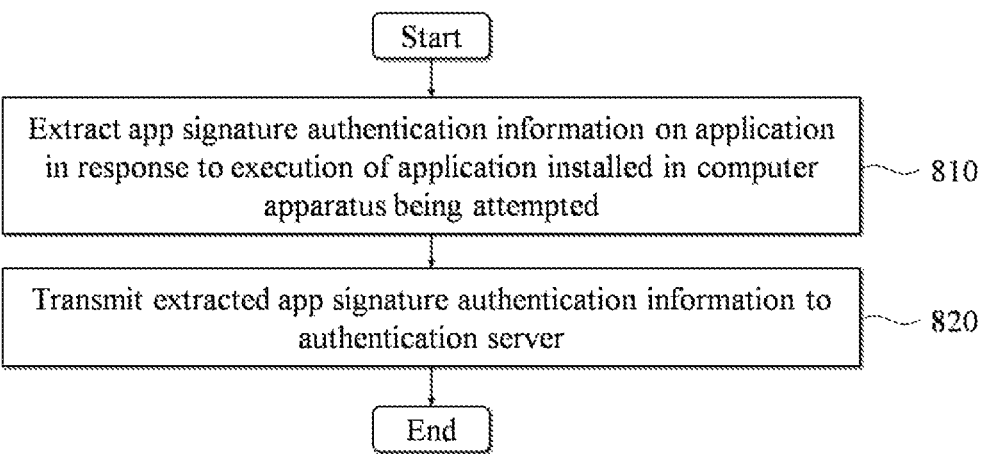
FIG. 8 is a flowchart illustrating an example of a forgery detection method of a mobile terminal according to an example embodiment.

FIG. 8 is a flowchart illustrating an example of a forgery detection method of a mobile terminal according to an example embodiment. The forgery detection method according to the example embodiment may be performed by the computer apparatus 200 implemented as a mobile terminal. Here, the processor 220 of the computer apparatus 200 may be configured to execute a control instruction according to a code of at least one computer program or a code of an OS included in the memory 210. Here, the processor 220 may control the computer apparatus 200 to perform operations 810 and 820 included in the method of FIG. 8 in response to a control instruction provided from a code stored in the computer apparatus 200.

In operation 810, in response to execution of an application installed in the computer apparatus 200 being attempted, the computer apparatus 200 may extract app signature authentication information on the application. Here, the app signature authentication information may include user information on a user of the computer apparatus 200 and signature information of the application. This app signature authentication information may further include information on a package name of the application and a version of the application as basic information of the application.

In certain example embodiments, the app signature authentication information may further include terminal information on the computer apparatus 200. For example, the terminal information may include at least one of an EMMC ID, an IMEI, and a MAC address. The terminal information may further include information on a package name of the application and a version of the application as basic information of the application.

In operation 820, the computer apparatus 200 may transmit the extracted app signature authentication information to an authentication server. Here, the authentication server may correspond to the aforementioned authentication server 320. Whether to allow authentication for the transmitted app signature authentication information may be determined in response to the authentication server receiving a selection to allow or block the authentication for the app signature authentication information through an operator terminal of the application. Here, when the authentication for the app signature authentication information is allowed, execution of the application may be allowed. When the authentication for the app signature authentication information is blocked, execution of the application may be blocked.

As described above, as the app signature authentication information includes user information, information on a user using a forged app may also be acquired instead of simply detecting forgery of the app.

FIG. 9 is a flowchart illustrating an example of a forgery detection method of an authentication server according to an example embodiment. The forgery detection method according to the example embodiment may be performed by the computer apparatus 200 that implements the authentication server 320. Here, the processor 220 of the computer apparatus 200 may be implemented to execute a control instruction according to a code of at least one computer program or a code of an OS included in the memory 210. Here, the processor 220 may control the computer apparatus 200 to perform operations 910 to 980 included in the method of FIG. 9 in response to a control instruction provided from a code stored in the computer apparatus 200.

In operation 910, in response to execution of an application being attempted in a mobile terminal, the computer apparatus 200 may receive app signature authentication information on the application from the mobile terminal. Here, the received app signature authentication information may correspond to the app signature authentication information transmitted in operation 820, that is, the information may include user information on a user of the mobile terminal and signature information of the application. Here, the app signature authentication information may further include information on a package name of the application and a version of the application as basic information of the application. As described above, as the user information is delivered together, information on a user using a forged app may also be acquired instead of simply detecting forgery of the app.

In operation 920, the computer apparatus 200 may receive a selection to allow or block authentication for the app signature authentication information through an operator terminal of the application. For example, the computer apparatus 200 may provide a page that includes a first function for displaying the app signature authentication information and a second function for receiving the selection to allow or block the authentication for the app signature authentication information. In this case, an operator of the application may select to allow or block the authentication for the app signature authentication information by accessing the page through an operator terminal. Here, the computer apparatus 200 may verify that the authentication is selected to be allowed or blocked through the second function in the provided page. Also, the page may further include a third function for displaying a list of authentication-allowed app signature authentication information and a list of authentication-blocked app signature authentication information for which authentication, a fourth function for changing authentication-allowed app signature authentication information to authentication-blocked app signature authentication information, and a fifth function for changing authentication-blocked app signature authentication information to authentication-allowed app signature authentication information. In this case, although authentication is already allowed, the operator of the application may block the authentication again if necessary. Also, since an authentication-allowed case and an authentication-blocked case are referred to for the respective app signature information, the operator of the application may share a whitelist and a blacklist for a signature of the application generated by the computer apparatus 200 as the authentication server 320.

In operation 930, the computer apparatus 200 may store the app signature authentication information as "allowing" or "blocking" the authentication for the app signature authentication information according to the selection. Here, a list of app signature authentication information stored as allowing the authentication may be a whitelist, and a list of app signature authentication information may be a blacklist. To this end, in response to the selection to allow the authentication for the app signature authentication information, the computer apparatus 200 may add the app signature authentication information to the whitelist. Also, in response to the selection to block the authentication for the app signature authentication information, the computer apparatus 200 may add the app signature authentication information to the blacklist.

In operation 940, in response to the authentication being allowed, the computer apparatus 200 may allow execution of the application in the mobile terminal.

In operation 950, in response to the authentication being blocked, the computer apparatus 200 may block execution of the application in the mobile terminal.

That is, even in a situation in which a separate whitelist or blacklist is not provided in advance, the computer apparatus 200 as the authentication server 320 may process the authentication for app signature authentication information requested through an operator of the application and, at the same time, may generate the whitelist or the blacklist.

In operation 960, in response to re-execution of the application being attempted in the mobile terminal, the computer apparatus 200 may receive app signature authentication information on the application from the mobile terminal. That is, the computer apparatus 200 may receive the app signature authentication information every time the application is executed in the mobile terminal.

In operation 970, in response to the app signature authentication information being stored as allowing the authentication for the app signature authentication information, the computer apparatus 200 may allow the re-execution of the application. As described above, if app signature authentication information delivered when the application is first executed in the mobile terminal is stored as allowing the authentication, the computer apparatus 200 may allow the re-execution of the application in the mobile terminal using pre-stored information (information of the whitelist) without going through the operator of the application.

In operation 980, in response to the app signature authentication information being stored as blocking the authentication for the app signature authentication information, the computer apparatus 200 may block the re-execution of the application. As described above, if app signature authentication information delivered when the application is first executed in the mobile terminal is stored as blocking the authentication, the computer apparatus 200 may block the re-execution of the application in the mobile terminal using pre-stored information (information of the blacklist) without going through the operator of the application.

Figure 10:
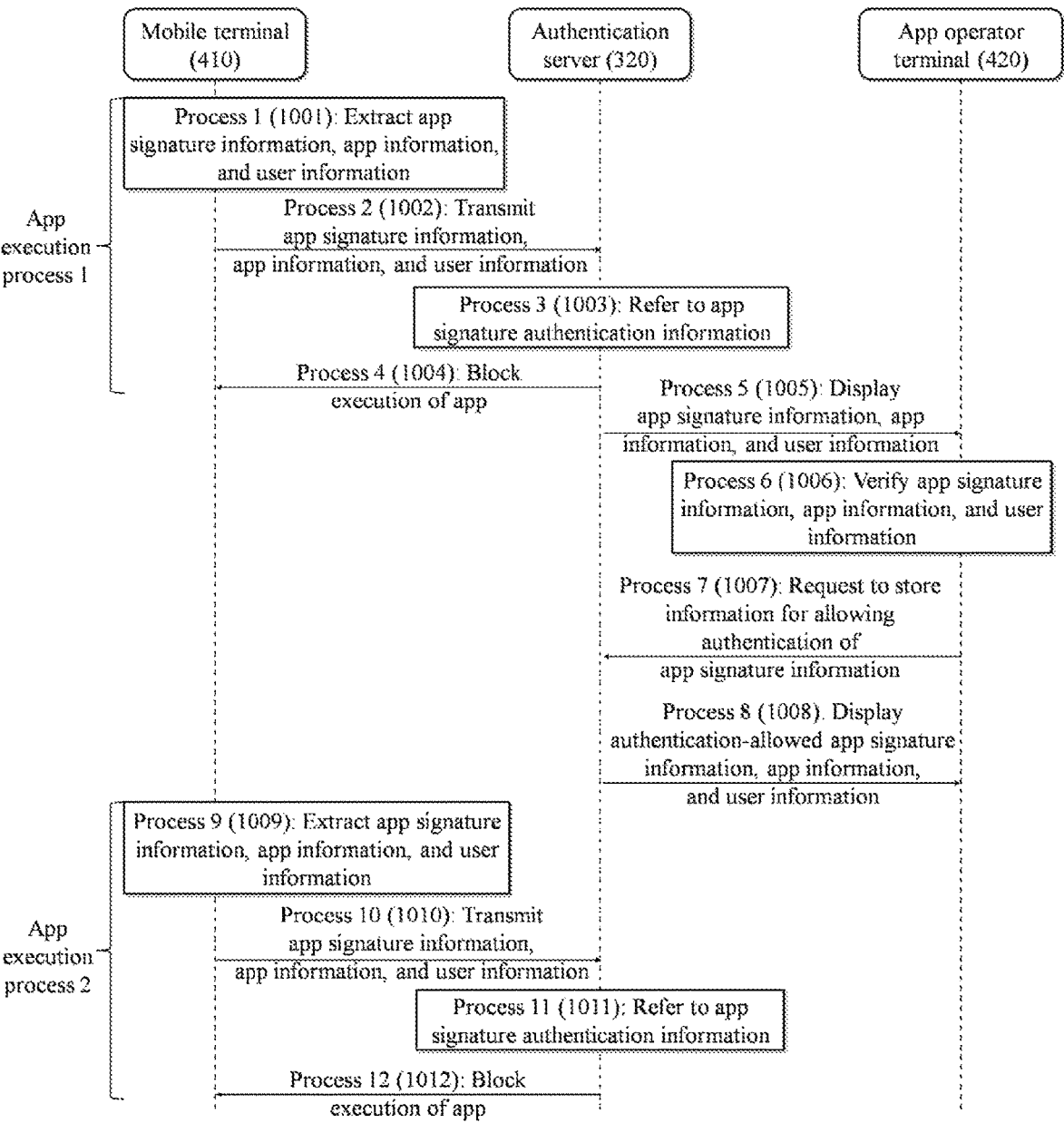
FIG. 10 illustrates another example of an app authentication allow scenario according to an example embodiment.

FIG. 10 illustrates another example of an app authentication allow scenario according to an example embodiment. Processes (1001) to (1012) of FIG. 10 may be performed in association with a process in which the mobile terminal 410 attempts to execute an app installed in the mobile terminal 410. Here, it is assumed that app signature authentication for a specific app installed in the mobile terminal 410 and desired to be executed by the mobile terminal 410 is stored to be blocked in the authentication server 320. Storing information as blocking app signature authentication may correspond to recording app signature authentication information that includes app signature information, app information, and user information in a blacklist of the authentication server 320 in association with the corresponding specific app.

In process 1 (1001), the mobile terminal 410 may extract app signature information, app information, and user information. As described above, the app signature information may be signature information that is generated for the app installed in the mobile terminal 410. If the app is forged, app signature information of the forged app may differ from app signature information of an original app. Also, the app information may include information on a package name of the app and a version of the app as basic information of the app, and the user information may include a user identifier of the corresponding user in a service that is provided through the app.

In process 2 (1002), the mobile terminal 410 may transmit the extracted app signature information, app information, and user information to the authentication server 320. For example, the mobile terminal 410 may transmit the app signature information, the app information, and the user information to the authentication server 320 through the network 170 under control of the app.

In process 3 (1003), the authentication server 320 may refer to the app signature authentication information. As described above, herein, information representing allowing app signature authentication for a specific app installed in the mobile terminal 410 may be stored in the authentication server 320. For example, the authentication server 320 may refer to information regarding whether to allow or block execution of an app corresponding to the received app information and user information through the blacklist and/or a whitelist. Herein, the authentication server 320 may extract information representing blocking the app signature authentication for the specific app through the blacklist.

In process 4 (1004), the authentication server 320 may block execution of the app. Here, the app to be blocked refers to the specific app installed in the mobile terminal 410 and may be an app corresponding to the app information and the user information transmitted from the mobile terminal 410. Unless the following additional processes (particularly, process 5 (1005) to process 7 (1007)) are performed, authentication of the app signature information for executing the corresponding app may be continuously blocked.

In process 5 (1005), the authentication server 320 may display the app signature information, the app information, and the user information on the app operator terminal 420. For example, the authentication server 320 may display the app signature information, the app information, and the user information through a user interface of a page accessible by an app provider, and an app operator may receive the app signature information, the app information, and the user information by accessing the corresponding page using the app operator terminal 420 of the app operator.

In process 6 (1006), the app operator terminal 420 may verify the app signature information, the app information, and the user information. Here, the app signature information, the app information, and the user information may be manually verified by the app operator or may be automatically verified through a work of comparing, by the app operator terminal 420, the app signature information, the app information, and the user information according to a preset logic. For example, the app operator terminal 420 may compare app signature information registered for a corresponding app to app signature information of the app for which authentication is requested and may allow or block authentication of the corresponding app signature information. Also, the app operator terminal 420 may allow or block authentication of app signature information separate from the authentication-requested app signature information with respect to preset users. Herein, the example embodiment describes a scenario in which blocked authentication of app signature information is allowed again.

In process 7 (1007), the app operator terminal 420 may request the authentication server 320 to store information for allowing authentication of the corresponding app signature information. In this case, the authentication server 320 may store the app signature authentication information in the whitelist such that authentication for the corresponding app signature information, app information and user information may be allowed. Such app signature authentication information may include the corresponding app signature information, app information, and user information. That is, the corresponding app signature information, app information, and user information stored in the blacklist of the authentication server 320 may be moved to and recorded in the whitelist.

In process 8 (1008), the authentication server 320 may display the app signature information, the app information, and the user information for which authentication is allowed. For example, the authentication server 320 may display the app signature information, the app information, the user information, and information representing that authentication for the corresponding app signature information is allowed through the user interface of the page. The app operator may receive the corresponding information by accessing the page through the app operator terminal 420. This may represent that the app operator may share the whitelist of the authentication server 320 through the page.

In response to allowing authentication of app signature information for the specific app of the mobile terminal 410, execution of the corresponding specific app may be allowed. Process 9 (1009) to process 12 (1012) represent a process of allowing execution of the app. The mobile terminal 410 may extract the app signature information, the app information, and the user information in process 9 (1009), and may transmit the extracted app signature information, app information, and user information to the authentication server 320 in process 10 (1010). In process 11 (1011), the authentication server 320 may refer to the app signature authentication information. Since the authentication server 320 stores the corresponding app signature information, app information, and user information in the whitelist according to a request from the app operator terminal 420 in process 7 (1007), the authentication server 320 may allow execution of the corresponding app in process 12 (1012).

Figure 11:
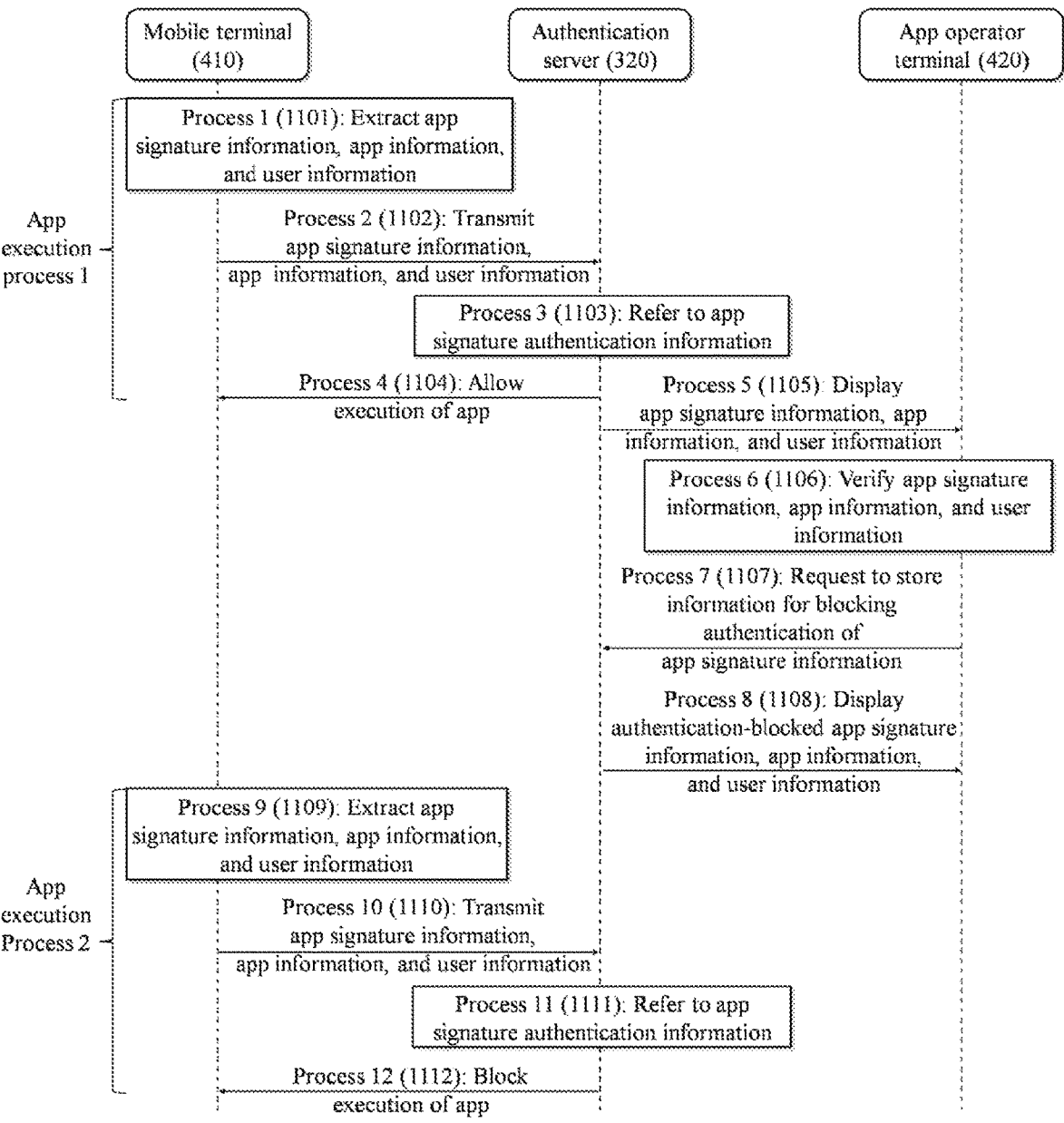
FIG. 11 illustrates another example of an app authentication block scenario according to an example embodiment.

FIG. 11 illustrates another example of an app authentication block scenario according to an example embodiment.

Processes (1101) to (1112) of FIG. 11 may be performed in association with a process in which the mobile terminal 410 attempts to execute an app installed in the mobile terminal 410. Here, it is assumed that app signature authentication for a specific app installed in the mobile terminal 410 and desired to be executed by the mobile terminal 410 is stored to be allowed in the authentication server 320. Storing as allowing app signature authentication may correspond to recording app signature authentication information that includes app signature information, app information and user information in a whitelist of the authentication server 320 in association with the corresponding specific app.

In process 1 (1101), the mobile terminal 410 may extract app signature information, app information, and user information. As described above, the app signature information may be signature information that is generated for the app installed in the mobile terminal 410. If the app is forged, app signature information of the forged app may differ from app signature information of an original app. Also, the app information may include information on a package name of the app and a version of the app as basic information of the app, and the user information may include a user identifier of the corresponding user in a service that is provided through the app.

In process 2 (1102), the mobile terminal 410 may transmit the extracted app signature information, app information, and user information to the authentication server 320. For example, the mobile terminal 410 may transmit the app signature information, the app information, and the user information to the authentication server 320 through the network 170 under control of the app.

In process 3 (1103), the authentication server 320 may refer to the app signature authentication information. As described above, herein, information representing allowing app signature authentication for a specific app installed in the mobile terminal 410 may be stored in the authentication server 320. For example, the authentication server 320 may refer to information regarding whether to allow or block execution of an app corresponding to the received app information and user information through a blacklist and/or the whitelist. Herein, the authentication server 320 may extract information representing blocking the app signature authentication for the specific app through the whitelist.

In process 4 (1104), the authentication server 320 may allow execution of the app. Here, the app to be allowed refers to the specific app installed in the mobile terminal 410 and may be an app corresponding to the app information and the user information transmitted from the mobile terminal 410. Unless the following additional processes (particularly, process 5 1105 to process 7 (1107)) are performed, authentication of the app signature information for executing the corresponding app may be continuously allowed.

In process 5 (1105), the authentication server 320 may display the app signature information, the app information, and the user information on the app operator terminal 420. For example, the authentication server 320 may display the app signature information, the app information, and the user information through a user interface of a page accessible by an app provider, and an app operator may receive the app signature information, the app information, and the user information by accessing the corresponding page using the app operator terminal 420 of the app operator.

In process 6 (1106), the app operator terminal 420 may verify the app signature information, the app information, and the user information. Here, the app signature information, the app information, and the user information may be manually verified by the app operator or may be automatically verified through a process of comparing, by the app operator terminal 420, the app signature information, the app information, and the user information according to a preset logic. For example, the app operator terminal 420 may compare app signature information registered for a corresponding app to app signature information of the app for which authentication is requested, and may allow or block authentication of the corresponding app signature information. Also, the app operator terminal 420 may allow or block authentication of app signature information separate from the authentication-requested app signature information with respect to preset users. Herein, the example embodiment describes a scenario in which allowed authentication of app signature information is blocked again.

In process 7 (1107), the app operator terminal 420 may request the authentication server 320 to store information for blocking authentication of the corresponding app signature information. In this case, the authentication server 320 may store the app signature authentication information in the blacklist such that authentication for the corresponding app signature information, app information and user information may be blocked. Such app signature authentication information may include the corresponding app signature information, app information, and user information. That is, the corresponding app signature information, app information, and user information stored in the whitelist of the authentication server 320 may be moved to and recorded in the blacklist.

In process 8 (1108), the authentication server 320 may display the app signature information, the app information, and the user information for which authentication is blocked. For example, the authentication server 320 may display the app signature information, the app information, the user information, and information representing that authentication for the corresponding app signature information is blocked through the user interface of the page. The app operator may receive the corresponding information by accessing the page through the app operator terminal 420. This may represent that the app operator may share the blacklist of the authentication server 320 through the page.

In response to blocking authentication of app signature information for the specific app of the mobile terminal 410, execution of the corresponding specific app may be blocked. Process 9 (1109) to process 12 (1112) represent a process of blocking execution of the app. The mobile terminal 410 may extract the app signature information, the app information, and the user information in process 9 (1109), and may transmit the extracted app signature information, app information, and user information to the authentication server 320 in process 10 (1110). In process 11 (1111), the authentication server 320 may refer to the app signature authentication information. Since the authentication server 320 stores the corresponding app signature information, app information, and user information in the blacklist according to a request from the app operator terminal 420 in process 7 (1107), the authentication server 320 may block execution of the corresponding app in process 12 (1112).

As described above, according to some example embodiments, it is possible to flexibly detect forgery of a mobile application without registering in advance all the signatures in such a manner that a client side delivers signature information on an application and an identifier of a user (e.g., a user ID) to a server side and the server side allows an application operator side to determine whether to allow or block an application authentication according to a business situation.

The systems or apparatuses described herein may be implemented using hardware components or a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, in combination with program instructions, data files, data structures, and the like. Here, the media may continuously store computer-executable programs or may transitorily store the same for execution or download. Also, the media may consist of various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A forgery detection method performed by a computer apparatus comprising at least one processor, the forgery detection method comprising:

in response to execution of an application being attempted in a mobile terminal which is different from the computer apparatus, receiving, by the at least one processor, app signature authentication information on the application from the mobile terminal;

receiving, by the at least one processor, a selection to allow or block authentication for the app signature authentication information through an operator terminal of the application;

storing, by the at least one processor, the app signature authentication information for allowing or blocking the authentication for the app signature authentication information according to the selection;

in response to the authentication being allowed, allowing, by the at least one processor, the execution of the application in the mobile terminal; and in response to the authentication being blocked, blocking, by the at least one processor, the execution of the application in the mobile terminal, and wherein the operator terminal includes a terminal of an administrator for a service provided by the authentication, and wherein the receiving of the selection comprises:

providing, on the operator terminal, a page on a display that includes a first function for displaying the app signature authentication information and a second function for receiving the selection to allow or block the authentication for the app signature authentication information; and verifying that the authentication is selected to be allowed or blocked through the second function in the provided page, and wherein the storing as allowing or blocking the authentication comprises:

in response to the selection to allow the authentication for the app signature authentication information, creating a whitelist and adding the app signature authentication information to the newly created whitelist, wherein a whitelist for authentication is not provided prior to the execution of the application being attempted in the mobile terminal; and in response to the selection to block the authentication for the app signature authentication information, creating a blacklist and adding the app signature authentication information to the newly created blacklist.

2. The forgery detection method of claim 1, wherein the page further includes:

a third function for displaying a list of authentication-allowed app signature authentication information and a list of authentication-blocked app signature authentication information, a fourth function for changing authentication-allowed app signature authentication information to authentication-blocked app signature authentication information, and a fifth function for changing authentication-blocked app signature authentication information to authentication-allowed app signature authentication information.

3. The forgery detection method of claim 1, further comprising:

in response to re-execution of the application being attempted in the mobile terminal, receiving, by the at least one processor, app signature authentication information on the application from the mobile terminal;

in response to the app signature authentication information being stored as allowing the authentication for the app signature authentication information, allowing, by the at least one processor, the re-execution of the application; and in response to the app signature authentication information being stored as blocking the authentication for the app signature authentication information, blocking, by the at least one processor, the re-execution of the application.

4. The forgery detection method of claim 1, wherein the app signature authentication information includes user information on a user of the mobile terminal and signature information of the application.

5. The forgery detection method of claim 4, wherein the app signature authentication information further includes a package name of the application and a version of the application as basic information of the application.

6. The forgery detection method of claim 4, wherein the app signature authentication information further includes terminal information on the mobile terminal, and the terminal information includes at least one of an embedded multimedia card (EMMC) ID, an international mobile station equipment identity (IMEI), and a media access control (MAC) address.

7. A forgery detection method performed by a computer apparatus comprising at least one processor, the forgery detection method comprising:

in response to execution of an application installed on the computer apparatus being attempted, extracting, by the at least one processor, app signature authentication information on the application; and transmitting, by the at least one processor, the extracted app signature authentication information to an authentication server, wherein the app signature authentication information includes user information on a user of the computer apparatus and signature information of the application, wherein whether to allow or block authentication for the transmitted app signature authentication information is determined in response to receiving a selection to allow or block the authentication for the app signature authentication information through an operator terminal of the application, wherein the operator terminal includes a terminal of an administrator for a service provided by the authentication, and in response to the authentication for the app signature authentication information being allowed, the execution of the application is allowed, and in response to the authentication for the app signature authentication information being blocked, the execution of the application is blocked, and wherein the receiving the selection to allow or block the authentication comprises:

providing, on the operator terminal, a page on a display that includes a first function for displaying the app signature authentication information and a second function for receiving the selection to allow or block the authentication for the app signature authentication information; and verifying that the authentication is selected to be allowed or blocked through the second function in the provided page, and wherein the storing as allowing or blocking the authentication comprises:

in response to the selection to allow the authentication for the app signature authentication information, creating a whitelist and adding the app signature authentication information to the newly created whitelist, wherein a whitelist for authentication is not provided prior to the execution of the application being attempted in the mobile terminal; and in response to the selection to block the authentication for the app signature authentication information, creating a blacklist and adding the app signature authentication information to the newly created blacklist.

8. A non-transitory computer-readable recording medium storing a computer program to perform the forgery detection method of claim 1 in the computer apparatus.

9. A computer apparatus comprising:

at least one processor configured to execute computer-readable instructions, wherein the at least one processor is configured to:

in response to execution of an application being attempted in a mobile terminal which is different from the computer apparatus, receive app signature authentication information on the application from the mobile terminal, receive a selection to allow or block authentication for the app signature authentication information through an operator terminal of the application, store the app signature authentication information as allowing or blocking the authentication for the app signature authentication information according to the selection, in response to the authentication being allowed, allow the execution of the application in the mobile terminal, and in response to the authentication being blocked, block the execution of the application in the mobile terminal, and wherein the operator terminal includes a terminal of an administrator for a service provided by the authentication, and wherein the receiving the selection comprises:

providing, on the operator terminal, a page on a display that includes a first function for displaying the app signature authentication information and a second function for receiving the selection to allow or block the authentication for the app signature authentication information; and verifying that the authentication is selected to be allowed or blocked through the second function in the provided page, and wherein the storing as allowing or blocking the authentication comprises:

in response to the selection to allow the authentication for the app signature authentication information, creating a whitelist and adding the app signature authentication information to the newly created whitelist, wherein a whitelist for authentication is not provided prior to the execution of the application being attempted in the mobile terminal; and in response to the selection to block the authentication for the app signature authentication information, creating a blacklist and adding the app signature authentication information to the newly created blacklist.

10. The computer apparatus of claim 9, wherein the at least one processor is configured to:

in response to the selection to allow the authentication for the app signature authentication information, add the app signature authentication information to a whitelist, and in response to the selection to block the authentication for the app signature authentication information, add the app signature authentication information to a blacklist.

11. The computer apparatus of claim 9, wherein the at least one processor is configured to:

in response to re-execution of the application being attempted in the mobile terminal, receive app signature authentication information on the application from the mobile terminal, in response to the app signature authentication information being stored as allowing the authentication for the app signature authentication information, allow the re-execution of the application, and in response to the app signature authentication information being stored as blocking the authentication for the app signature authentication information, block the re-execution of the application.

12. The computer apparatus of claim 9, wherein the app signature authentication information includes user information on a user of the mobile terminal and signature information of the application.

\* \* \* \* \*